United States Patent [19]

Tajima et al.

[11] Patent Number: 5,175,479
[45] Date of Patent: Dec. 29, 1992

[54] MOVING BODY POSITION CONTROL APPARATUS AND SIGNAL REPRODUCING APPARATUS

[75] Inventors: Fumio Tajima, Ibaraki; Hiroshi Katayama, Hitachi; Taizou Miyazaki, Hitachi; Shigeki Morinaga, Hitachi; Nobuyoshi Mutoh, Katsuta, all of Japan; Seiichi Narushima, Landsberg am Lech, Fed. Rep. of Germany

[73] Assignee: Hitachi, Ltd., Tokyo, Japan

[21] Appl. No.: 654,194

[22] Filed: Feb. 12, 1991

[30] Foreign Application Priority Data

Feb. 13, 1990 [JP] Japan .................. 2-029594

[51] Int. Cl.⁵ .............................................. G05B 11/01
[52] U.S. Cl. ................................... 318/560; 318/561
[58] Field of Search ............... 318/609, 610, 723, 629, 318/632, 561, 773, 254, 560; 310/156

[56] References Cited

U.S. PATENT DOCUMENTS

| | | | |
|---|---|---|---|
| 4,672,253 | 6/1987 | Tajima et al. | 310/156 X |
| 4,879,502 | 11/1989 | Endo et al. | 318/723 |
| 4,914,361 | 4/1990 | Tajima et al. | |
| 4,980,617 | 12/1990 | Tajima et al. | 318/609 X |
| 5,023,924 | 6/1991 | Tajima et al. | 318/254 |

FOREIGN PATENT DOCUMENTS 15303 11/1988 Japan .
308188 11/1988 Japan .
159988 6/1990 Japan .

Primary Examiner—William M. Shoop, Jr.
Attorney, Agent, or Firm—Antonelli, Terry Stout & Kraus

[57] ABSTRACT

There is provided position error computing means for sampling an error value between a position detecting signal derived from means for detecting the position of a moving body and a position command signal supplied from outside and for computing a position error value on the basis of two or more past values of said error values. There is also provided a position control apparatus in which the magnitude of a gain of a position control loop is changed according to the above described position error value. Further, there is also provided a signal reproducing apparatus or a magnetic signal reproducing apparatus using the above described position control.

6 Claims, 11 Drawing Sheets

MOVING BODY POSITION CONTROL APPARATUS AND SIGNAL REPRODUCING APPARATUS

BACKGROUND OF THE INVENTION

The present invention relates to a position control apparatus for a moving body, and in particular to a moving body position control apparatus suitable to control a device having operation characteristics largely affected by position variation, such as a high-precision servomotor and a video tape recorder driven by a motor of this kind.

It is desired that the velocity of a drive motor for a VTR (video tape recorder) is constant. Velocity variation (such as rotation unevenness, velocity ripple, or torque ripple) disturbs images, resulting in significantly impaired reliability and quality of the VTR.

In apparatuses of this kind, DC motors were mainly used. In recent years, brushless motors each running at a speed which can be changed freely and easily are adopted in increasing examples. Since the brushless motors have no mechanical brushes, various problems caused by abrasion or abrasion powder of brushes or commutators are removed. On the other hand, brushless motors of a 120-degree conduction system have a drawback that torque ripple and hence rotation unevenness (velocity variation) at the time of operation are caused by flux linkage of the conducting coil differing depending upon the position of the rotor.

In general, VTR motors are controlled by position control and velocity control. As a method for mitigating the above described drawback, therefore, there has been proposed in JP-A-1-308188 (U.S. Pat. No. 4,914,361) a scheme in which the gain of the velocity control system is changed according to the operation state of the motor. However, this scheme has a drawback that selection of control constants becomes complicated because of the mixed presence of both position and velocity control systems and rotation unevenness becomes large depending upon the selection.

As another method for mitigating the above described drawback, a scheme in which position control, i.e., a PLL (phase locked loop), is applied to a motor for VTR (especially a cylinder motor) is conceivable.

Since rotation unevenness changes according to the gain of the position control system (PLL control system), reduction of rotation unevenness can be achieved by increasing the gain of the position control system. If the gain of the position control system is excessively increased, however, the system becomes unstable and rotation unevenness is aggravated in some cases. An optimum gain for reducing the rotation unevenness exists in the control system. The optimum value of the gain of the position control system influencing this rotation unevenness is affected by the torque constant of the motor, resistance and so on. Since the optimum value of the gain depends upon the temperature, dispersion in resistance values of resistors in use, and so on, it assumes different values in individual control systems. In this technique of the prior art, therefore, the gain is set under the worst condition with due regard to quality dispersion in final products, for example.

On the other hand, a feedback control method of changing the feedback gain on the basis of a deviation value which is the difference between an angle actually detected by an encoder and a command value, is described in JP-A-63-287377.

Further, there is described in JP-A-63-15303 a learning control method, whereby in a playback robot the gain the next time is set on the basis of the error of the last time whenever the whole positioning process is finished.

In the control of the first conventional technique described above, such a value of control gain that the system may not become unstable even under the worst condition is selected in conformity with the worst condition. In a control apparatus operated at usual temperatures or in a control apparatus adjusted with no resistance dispersion or variations, therefore, the apparatus cannot be operated with the minimum rotation unevenness, resulting in a problem.

In the succeeding description of the feedback control method, the gain is changed according to the value of deviation. However, changing the gain according to the direction of temporal change of the deviation value is not described. That is to say, unless the gain is increased or decreased according to the direction of deviation value even if the deviation value is the same, the control system might become unstable.

Further, in the description of the aforementioned learning control scheme, the next positioning control gain is set whenever the positioning step is finished. During the positioning operation, however, the operation is conducted without changing the gain which has been set the last time. It is thus impossible to cope with a change of load or input power caused during the positioning operation for some reason, resulting in a problem.

SUMMARY OF THE INVENTION

In view of the above described points, an object of the present invention is to provide a moving body position control apparatus (and method), a brushless motor, or a signal reproducing apparatus and a magnetic signal reproducing apparatus, which are application products of the invention, capable of adjusting gain in the optimum direction to largely reduce the rotation unevenness even when the state of a moving body is changed by the load or temperature during the control of velocity or position.

In accordance with the present invention, a moving body position control apparatus which is the above-mentioned one object is accomplished by constructing a moving body position control apparatus comprising a position detecting element for detecting the moving position of a moving body, a position detecting circuit for detecting the position from a signal supplied from the position detecting element, the position control apparatus supplying an adequate current or voltage command to the moving body on the basis of a relation between a position detection signal obtained from the position detecting circuit and a position command signal supplied from outside, a driver for supplying a current or voltage having a magnitude depending upon the position command signal and the position detection signal, a microcomputer for comparing the position command signal with the position detection signal obtained from the position detecting circuit to drive the driver, computing means for computing a difference between the position command signal and the position detection signal as a position error and multiplying the position error by a gain to derive a driving signal of the driver, the computing means being included in the microcomputer, at least two past position error values being derived by the computing means, and gain adjusting means responsive to a positive change in position error value accompanied by a positive gain change to decrease the gain, responsive to a positive change in position error value accompanied by a negative gain change to increase the gain, responsive to a negative change in position error value accompanied by a positive gain change to increase the gain, and responsive to a negative change in position error value accompanied by a negative gain change to decrease the gain, the gain adjusting means being included in the microcomputer.

Further, in accordance with the present invention, a signal reproducing apparatus which is another object is accomplished by constructing a signal reproducing apparatus for moving on a track of a recording medium having a signal recorded thereon and for reproducing the signal recorded in the recording medium, the signal reproducing apparatus comprising detecting means for detecting the magnitude of a reproduced signal, means responsive to a detected value supplied from the detecting means to correct a position command of the signal reproducing apparatus, a driver responsive to the position command to drive an actuator of a signal reproducer, and means for calculating an integrated value of two or more past signals supplied from the detecting means, a control gain for correcting the position command according to the integrated value being made variable.

Further, in accordance with the present invention, a magnetic signal reproducing apparatus which is another object is accomplished by constructing a magnetic signal reproducing apparatus for controlling a head mounted on a rotary cylinder by means of a moving head actuator to reproduce a video signal recorded on magnetic tape, the magnetic signal reproducing apparatus comprising means for detecting a detected value of a video signal, means for correcting a position command and supplying such a position command as to maximize the video signal to a driver, and means responsive to an integrated value of two or more video signals to change a correction gain of the position command maximizing the above described integrated value.

Further, in accordance with the present invention, a brushless motor is accomplished by constructing a brushless motor comprising a position detecting element for detecting the moving position of a brushless motor, a position detecting circuit for detecting the position from a signal supplied from the position detecting element, a position control apparatus for supplying an adequate current or voltage command to an inverter for driving the brushless motor on the basis of a relation between a position detection signal obtained from the position detecting circuit and a position command signal supplied from outside, a microcomputer for comparing the position command signal with the position detection signal obtained from the position detecting circuit to drive the inverter, the microcomputer being included in the position control apparatus, computing means for computing a difference between the position command signal and the position detection signal as a position error and multiplying the position error by a gain to derive a driving signal of the inverter, the computing means being included in the microcomputer, at least two past position error values being derived by the computing means, and gain adjusting means responsive to a positive change in position error value accompanied by a positive gain change to decrease the gain, responsive to a positive change in position error value accompanied by a negative gain change to increase the gain, responsive to a negative change in position error value accompanied by a positive gain change to increase the gain, and responsive to a negative change in position error value accompanied by a negative gain change to decrease the gain, the gain adjusting means being included in the microcomputer.

In connection with the above described object, the moving body can be operated always with a gain of minimum rotation unevenness irrespective of a temperature change and resistance dispersion in resistor elements by grasping in the above described configuration a position error value obtained from two or more past position error values and the value of rotation unevenness on the basis of the direction of the position error and by changing the gain of position control thereby.

BRIEF DESCRIPTION OF THE DRAWINGS

FIG. 3 is a diagram illustrating how a position command and a position detection signal are taken in;

DESCRIPTION OF THE PREFERRED EMBODIMENTS

An embodiment of the present invention will hereafter be described in detail by referring to FIGS. 1 to 5.

Figure 1:
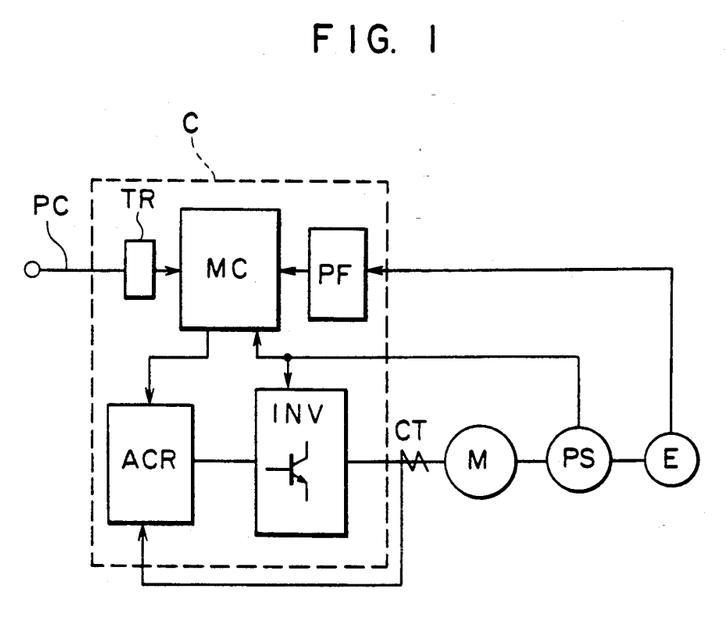
FIG. 1 is a basic block diagram showing an embodiment of a position control apparatus for a moving body according to the present invention.

FIG. 1 is a basic block diagram showing an embodiment of a moving body position control apparatus according to the present invention. It is assumed in FIG. 1 that the moving body is a brushless motor. With reference to FIG. 1, M denotes a brushless motor which is a moving body and may be either of the rotation type or straight moving type (linear motor type). Further, it doesn't matter whether a brush is present or not. In the illustrated example, however, a brush is not present. PS denotes a magnetic pole position detector for detecting the position of a rotor of the motor M. The magnetic pole position detector PS is used to change over the phase current of the motor M. The internal configuration of the motor M is not illustrated. However, a brushless motor is typically so configured that the position of the rotor may be electronically detected and a current may be caused to flow through each of two phase windings selected according to the position of the rotor. Character E denotes a position detector comprising an encoder attached to the rotation shaft of the motor M. The position detector E may comprise a frequency generator and a pulse generator in addition to the encoder.

INV denotes an inverter which is a driver for driving the motor M. Typically in the inverter INV, six switch elements form three positive arms and three negative arms, and currents each having a variable magnitude are caused to flow through two selected phase windings. ACR denotes an automatic current regulator which is so configured as to receive a current obtained by a current transformer CT. MC denotes a microcomputer having a function which will be described later. PF denotes a position detecting circuit for shaping the output waveform of the encoder E and informing the microcomputer MC of pulse edges (rising and falling edges). Actual position detection information is detected as the value of a free-running counter included in the microcomputer. On the other hand, a position command PC is taken from a position command taking-in circuit TR into the microcomputer as a pulse and detected as the value of the free-running counter in the same way as the output waveform of the encoder. A position control apparatus C mainly comprises the microcomputer MC, the automatic current regulator ACR, the driver (inverter) INV, the position detecting circuit PF, and the position command taking-in circuit TR.

The position detection information obtained by the position detecting circuit PF is taken into the microcomputer MC to control the magnitude of a current command according to the difference with respect to the position command signal. Further, a signal supplied from the magnetic pole position detector PS is similarly conveyed to the microcomputer MC and the driver INV. The microcomputer MC functions to process that signal, exercise on-off control of switching elements of the driver INV, and adjust the magnitude of the current value.

Figure 2:
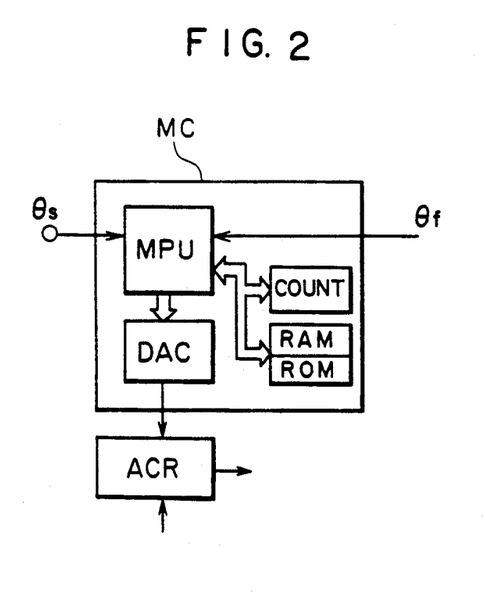
FIG. 2 is a configuration diagram showing an embodiment of a microcomputer illustrated in FIG. 1.

FIG. 2 is a configuration diagram showing an embodiment of the microcomputer MC illustrated in FIG. 1. The microcomputer MC comprises a free-running counter COUNT, a computing section MPU, a read-only memory ROM for storing a program and the like, a random access memory RAM for storing data and the like, and a digital-analog converter DAC. The output of the digital-analog converter is outputted to the automatic current regulator ACR.

Figure 3:
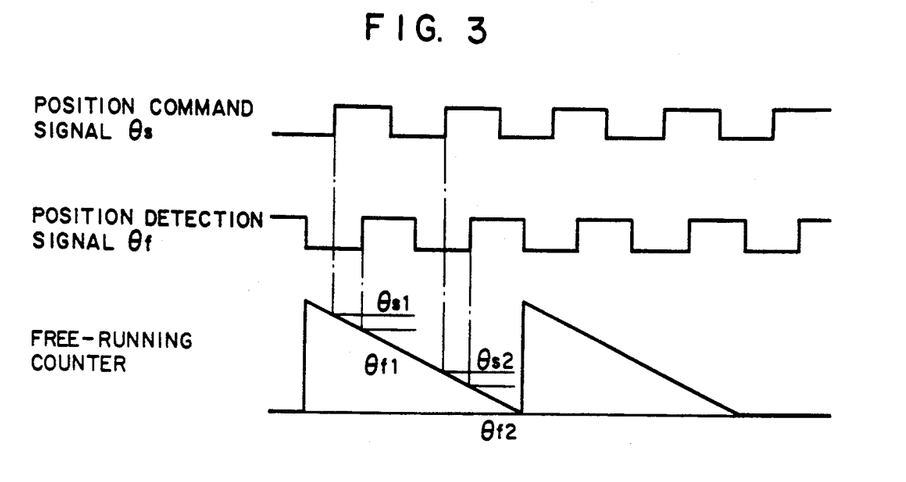

FIG. 3 shows the position command signal, the position detection signal and operation of the free-running counter COUNT. Rising edges of the position command signal $\theta_s$ and the position detection signal $\theta_f$ are detected in the free-running counter COUNT included in the microcomputer MC as the position command values $\theta_{s1}$, $\theta_{s2}$ - - - and the position detection values $\theta_{f1}$, $\theta_{f2}$ - - - .

Figure 4:
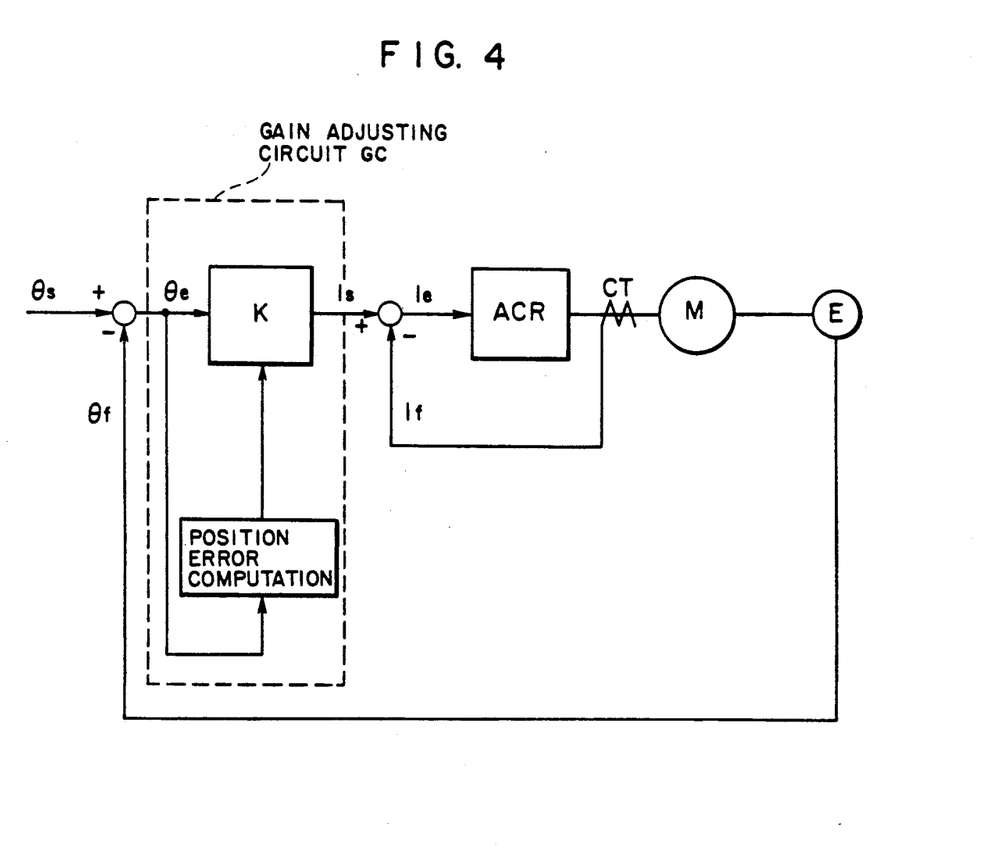
FIG. 4 is a block diagram showing an embodiment of variable proportional gain.

FIG. 4 is a block diagram showing an embodiment having a variable proportional gain. After the position command signal $\Theta_s$ and the position detection signal $\Theta_f$ have been taken into the microcomputer MC, a position error $\Theta_e$ is computed from the difference between the position command signal $\Theta_s$ and the position detection signal $\Theta_f$ by using a processing technique of software. After processing of proportional control represented by a gain K in FIG. 4, a new current command $I_s$ is outputted. In this processing, processing such as integral control, derivative control and control gain change can be used jointly, and thereby high precision processing can be anticipated. The automatic current regulator ACR comprises hardware and it is so configured that a current error $I_e$ may be computed from the current command Is and the current detection value $I_f$ derived by the current transformer CT and a current may be supplied to the motor M via the automatic current regulator ACR. The driver is omitted in FIG. 4.

This general configuration is nearly identical with the configuration heretofore known. As represented by a broken line frame, however, the present embodiment comprises a gain adjusting circuit GC for computing a new position error and changing the proportional gain of the position control system in accordance with the new position error thus computed.

Figure 5:
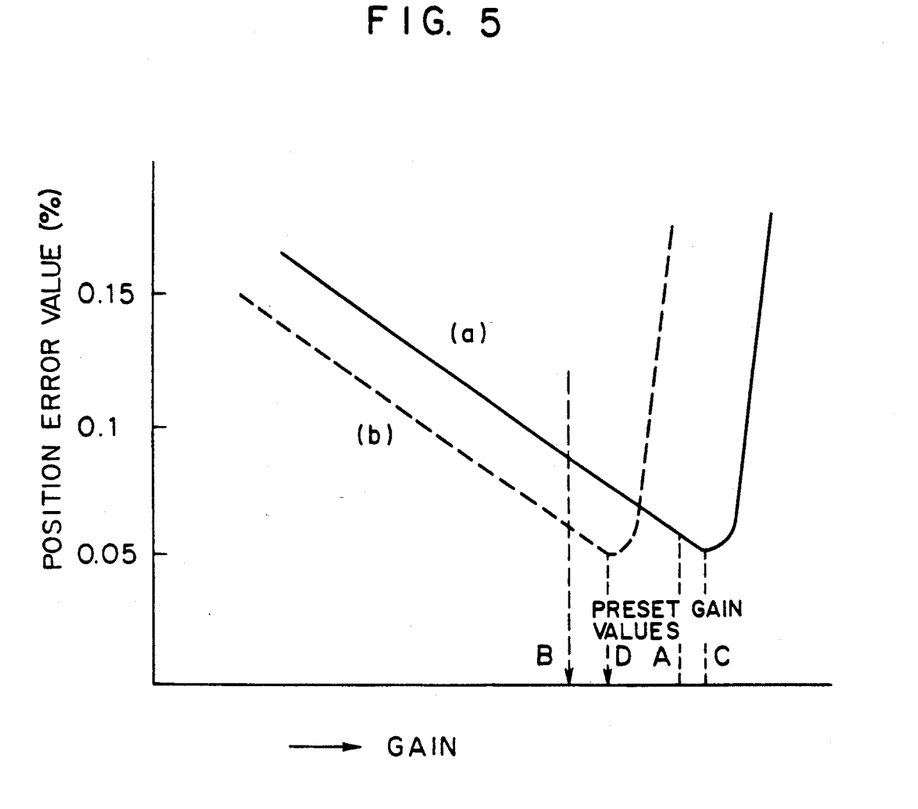
FIG. 5 is a diagram showing a dependence of rotation unevenness of a motor upon the proportional gain of a microcomputer.

FIG. 5 is a diagram showing dependence of rotation unevenness (wow and flutter) of the motor M upon the proportional gain of the microcomputer MC. By increasing the proportional gain, the rotation unevenness is reduced. If the proportional gain exceeds a fixed value, however, the control system becomes unstable and oscillates, resulting in rather worsened rotation unevenness. In FIG. 5, curve (a) represents standard characteristics of mass production goods of the control apparatus of this kind and the motor. Because of temperature characteristics of the motor and the control system and dispersion of components such as resistors caused by the fact that the automatic current regulator ACR is analog, however, a control apparatus and a motor having characteristics as represented by curve (b) is also included in the worst case. (In general, proportional gain is set at point A rather than the optimum value C to leave a slight margin.) If in this case proportional gain is set at point A which is the preset value of standard goods, oscillation is caused in the worst product. Therefore, it is inevitable that the proportional gain is set at point B whereat oscillation is not caused even in the worst goods. Accordingly, rotation unevenness (position error value) of the curve (a) corresponding to standard goods forming a large majority, increases, resulting in a drawback.

It is possible to provide the means for computing a new position error value and changing the proportional gain of the position control system according to the new position error value as surrounded by the broken line frame in FIG. 4 with such a function that control apparatuses and motors having dispersion as represented by the curves (a) and (b) of FIG. 5 may always be operated under such a condition as to decrease the position error value.

That is to say, if the magnitude of the position change can be grasped by computing the position error value, it is possible to operate the control apparatus and the motor at the lowest position error point C or D irrespective of characteristics of the curves (a) and (b) of FIG. 5.

The rotation unevenness is the AC component of the position error $\Theta_e$ between the position command signal $\Theta_s$ and the position signal $\Theta_f$ computed in the microcomputer MC. Assuming now that position control is conducted every pulse of the encoder E and a position error value (rotation unevenness) $W_F$ is computed every I pulses, the position error value (rotation unevenness) $W_F$ can be computed by the following equation for each cycle of I pulses, i.e. for pulses i=1 to I.

$$W_F = \frac{1}{I} \sum_{i=1}^{I} |\theta e(i) - \theta av| \quad (1)$$

$$\theta av = \frac{1}{I} \sum_{n=1}^{I} \theta e(n)$$

The term $\Theta_{av}$ is a DC component of the position error, and it is a value computed from a preceding cycle of I pules n=1 to I. That is to say, $W_F$ can be derived from the mean value of AC components of the position error $\Theta_e$.

Figure 6:
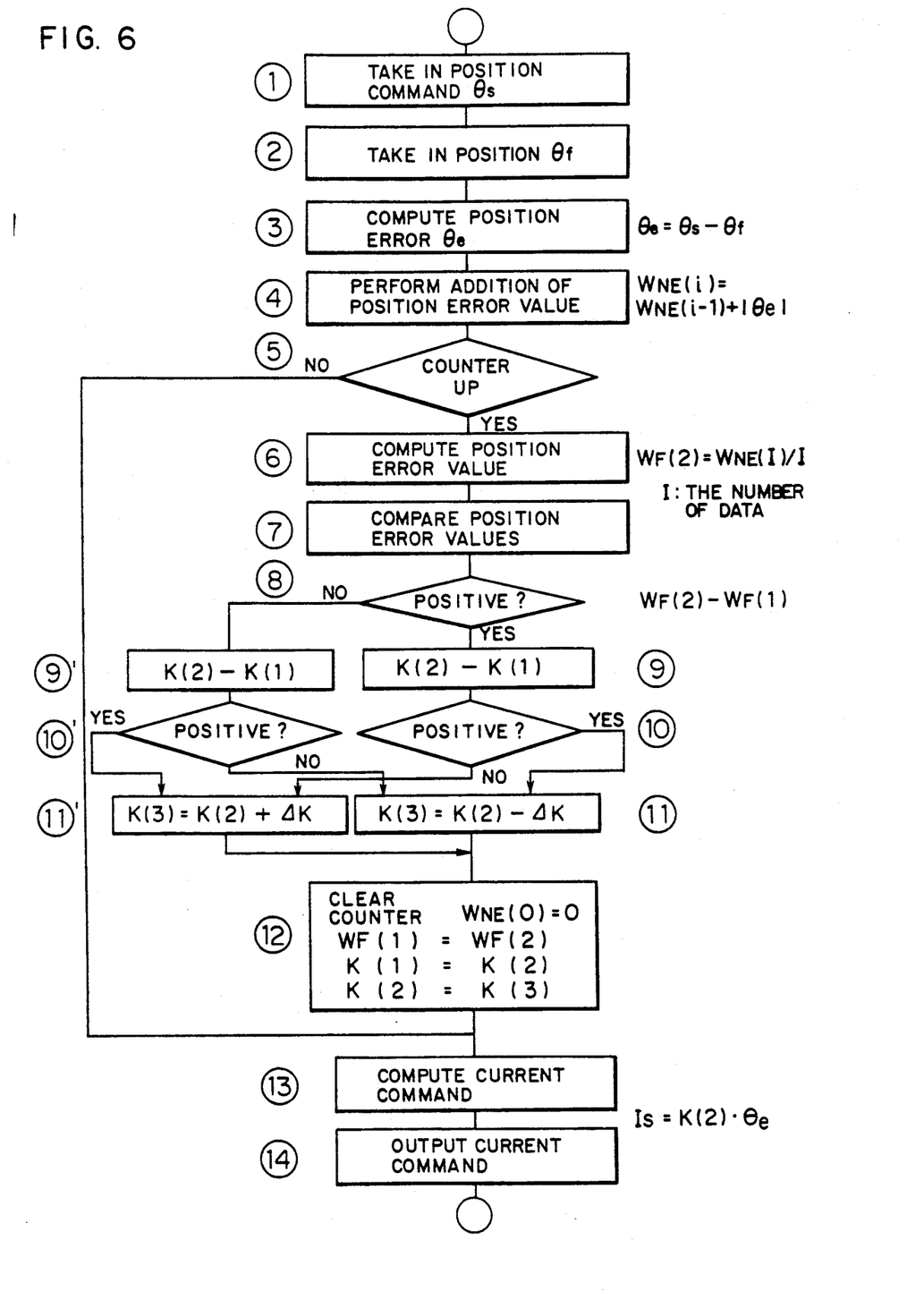
FIG. 6 is a flow chart showing an embodiment of a microcomputer program shown in FIG. 1.
Figure 6A:
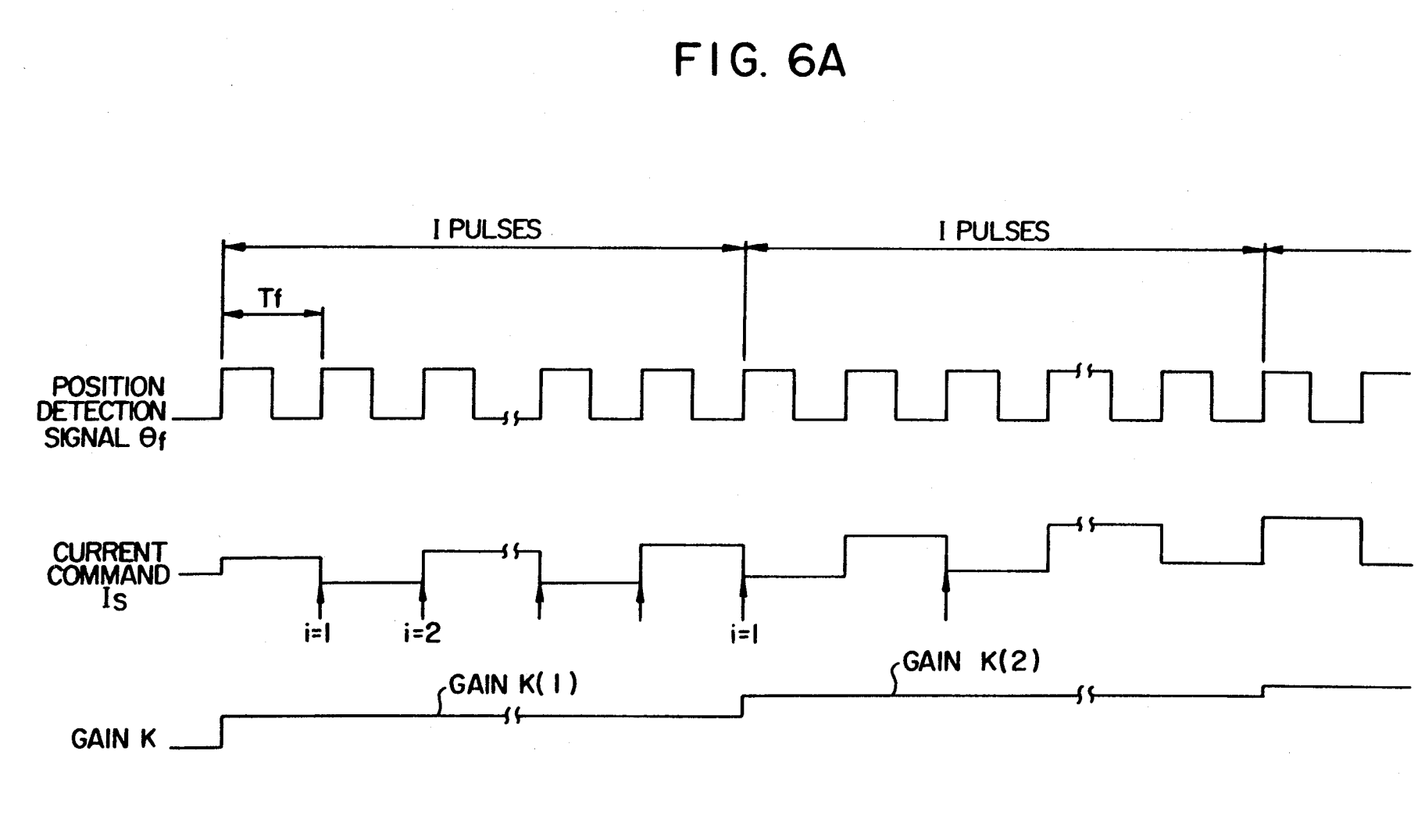
FIG. 6A is a diagram showing various values referred to in FIG. 6.

By using the expression for calculating the position error value heretofore described, the gain minimizing the position error value in FIG. 5 is obtained from the following expressions.

$$\frac{\partial W_F}{\partial t} < 0 \quad K_n = K_{n-1} + \Delta K \quad (2)$$

$$\frac{\partial W_F}{\partial t} > 0 \quad K_n = K_{n-1} - \Delta K \quad (3)$$

where
$K_n$ = n-th gain
$K_{n-1}$ = (n−1)-th gain
$\Delta K$ = change value of gain FIG. 6 is a flow chart showing an embodiment of a program of the microcomputer MC for implementing the above described means. FIG. 6A is a diagram showing various values referred to in FIG. 6. Position control operation is conducted once every pulse interval of the encoder E. The position command signal $\Theta_s$ is taken in at step ①. The position detection signal $\Theta_f$ is taken in at step ②. The position error $\Theta_e$ is computed at step ③. In order to compute the position error value based upon expression (1), calculation of every encoder pulse is performed at step ④ using an interim variable $W_{NE}$. At step ⑤, it is determined whether computation of the position error value has been performed for predetermined periods. Unless the above described periods are reached, the current command is computed and outputted at steps 13 and 14 by using the proportional term in the same way as the prior art. If it is found at step ⑤ that the period for calculating the position error value is reached, the position error value (rotation unevenness) is computed at step ⑥. Further, at steps ⑦ and ⑧, the position error value $W_{F(2)}$ is compared with data of the last time $W_{F(2)}$. If the position error value has increased (i.e., the result is Y), the difference between data of the proportional gain two times before K(1) and its data of the last K(2) time is derived at steps ⑨. At steps ⑩and 10'and steps ⑪ and 11', a new gain K(3) is obtained by correcting the gain K(2) by an amount $\Delta K$ in such a direction as to decrease the position error value and set at the gains of operation points at points C and D of FIG. 5 which are the optimum values of the rotation unevenness. Owing to the operation heretofore described, operation at the optimum gain always becomes possible.

As for an initial proportional gain setting of the position control value heretofore described, selection of the point B of FIG. 5 in the same way as the prior art is preferred because occurrence of hunting is reduced. Further, the lowest points C and D of rotation unevenness are easily affected by sudden disturbance, i.e., the system is apt to become unstable and there is a fear of oscillation. By returning the proportional gain to the initial preset value when the position error $\Theta_e$ or the position error value $W_F$ exceeds a predetermined value or a change (derivative coefficient) of the position error $\Theta_e$ or the position error value $W_F$ exceeds a predetermined value, however, it is possible to provide a position control apparatus which is safe and which has small rotation unevenness.

As for the position error value $W_F$, the mean value has been calculated. However, the root-mean-square value or the peak-hold value may be used instead. Further, even a value obtained by computing an arbitrary harmonic component with respect to the rotation position included in the position error by means of a Fourier integral can be put to practical use. (In brushless motors, the frequency of the switching period or the cogging torque is defined as the fundamental frequency.) That is to say, a value derived from the position error and the position can be used so long as the value becomes a function of rotation unevenness.

Further, although the position control circuit is represented by configuration which does not have velocity control as the minor loop as shown in FIG. 4, the present invention can be applied to a position control circuit having a velocity control system as well.

Further, although proportional control has heretofore been described, the same holds true for a position control apparatus having proportional integral or derivative control function as well. In this case, minimum position variation can be attained by selectively changing respective gains of proportional control, integral control and derivative control to minimize the position error value.

Another scheme of the present invention will now be described by referring to FIG. 7.

Figure 7:
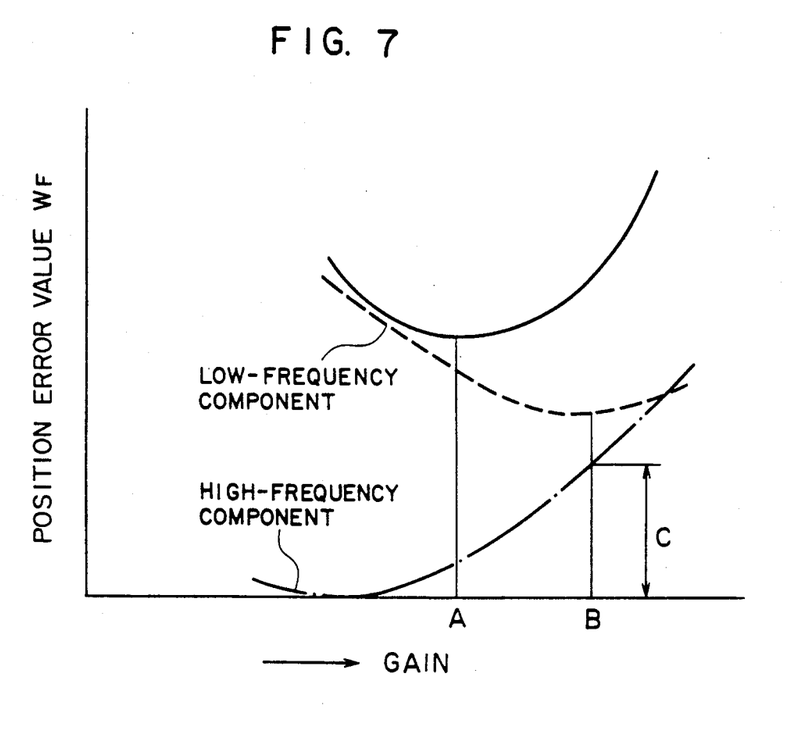
FIG. 7 is a diagram showing the result of component analysis of a position error value.

That is to say, FIG. 7 shows a high-frequency component and a low-frequency component which are primary factors of the position error value $W_F$. The position error value $W_F$ derived by the calculation expression (1) described before is divided into a low-frequency component and a high-frequency component. In particular, the high-frequency component becomes a primary factor of instability of the system and an oscillation phenomenon caused by increasing the gain.

The lowest value of the position error value $W_F$ computed by expression (1) is indicated by A in FIG. 7. In general, however, the influence of the high-frequency component on the system is smaller than that of the low-frequency component. Therefore, it is preferred to remove the high-frequency component and operate the system at point B where the low-frequency component is minimized. For example, when the present embodiment is applied to a capstan motor and voice wow and flutter is taken as its evaluation, the above described influence of the high-frequency component is far smaller than that of the low-frequency component and operation at the point B exhibits a better result in voice wow and flutter.

As the method for attaining the operation at the point B, i.e., a concrete method for removing the high-frequency component of the position error value, i.e., a low-pass filter, several methods can be considered. One of the simplest methods comprises the steps of deriving the mean value of a plurality of position errors and applying the expression (1) thereto thereafter. The following expression indicates that method.

$$W_F = \frac{1}{M} \sum_{m=1}^{M} \left| \frac{1}{N} \sum_{n=1}^{N} \theta e\{N \cdot (m-1) - n\} - \theta_{av} \right| \quad (4)$$

In this expression, $M \times N = I$ (where N is an integer not less than 2). That is to say, by deriving the mean value of N position errors and then deriving the mean value of the absolute values of M such mean values, the high-frequency component is removed and only the low-frequency component remains. Optimum selection of the value of N can be made by the system.

Figure 8:
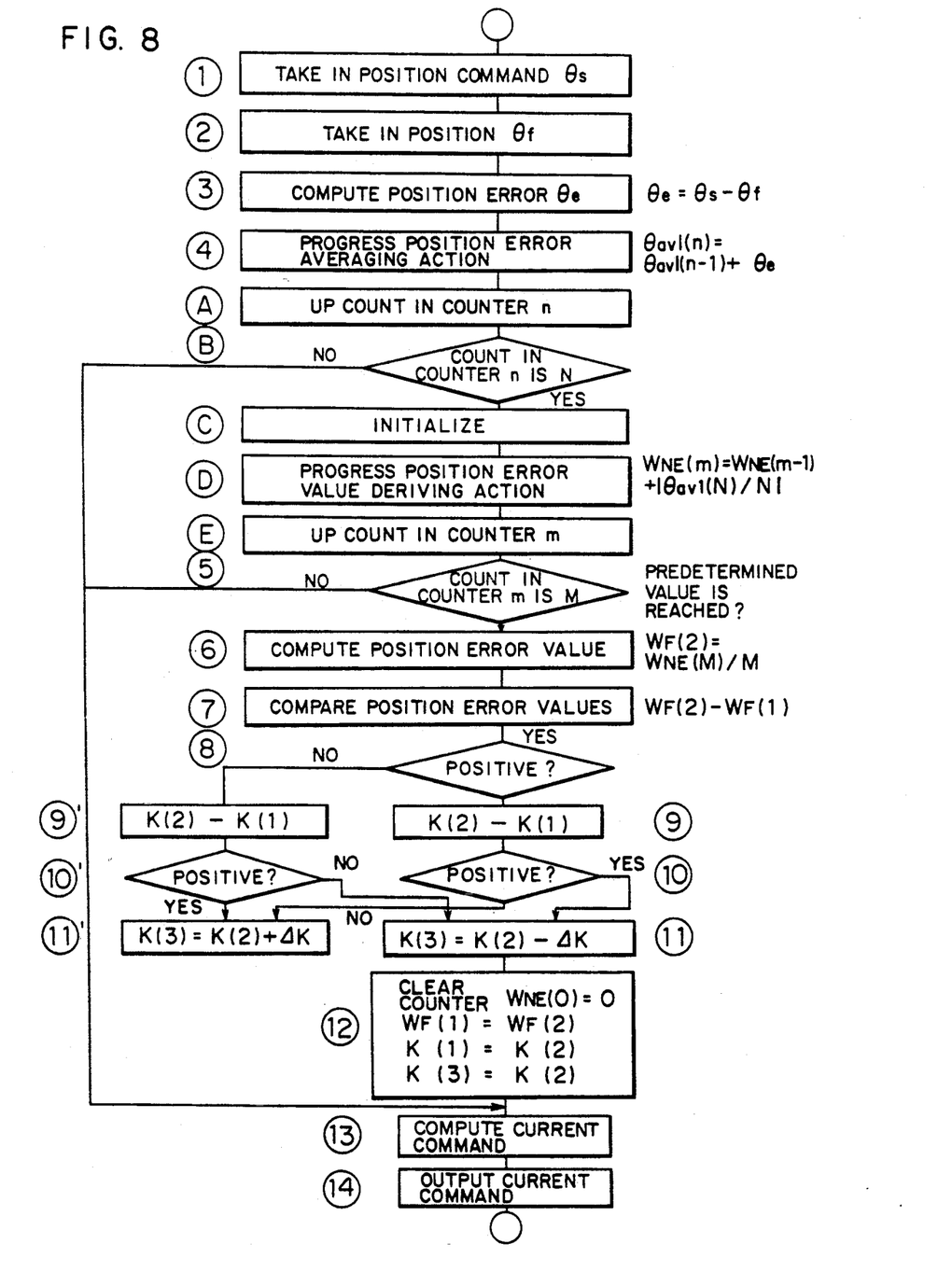
FIG. 8 is a flow chart showing another embodiment of the present invention.

FIG. 8 is a flow chart showing contents of processing in the microcomputer based upon the present invention method. In the example shown in FIG. 8, position control is exercised at a rate of once per pulse interval of a FG (frequency generator) of encoder E in FIG. 1 (see page 11, lines 14–16).

That is to say, steps ① to 14 of FIG. 8 are identical with those of FIG. 6. Improved processing of the present invention is represented E. That is to say, a flow chart for removing the high-frequency component by deriving the mean value of N position errors (i.e., integrating N errors) is shown. The characteristic for cutting the high-frequency component is controlled by the number of N.

Figure 9:
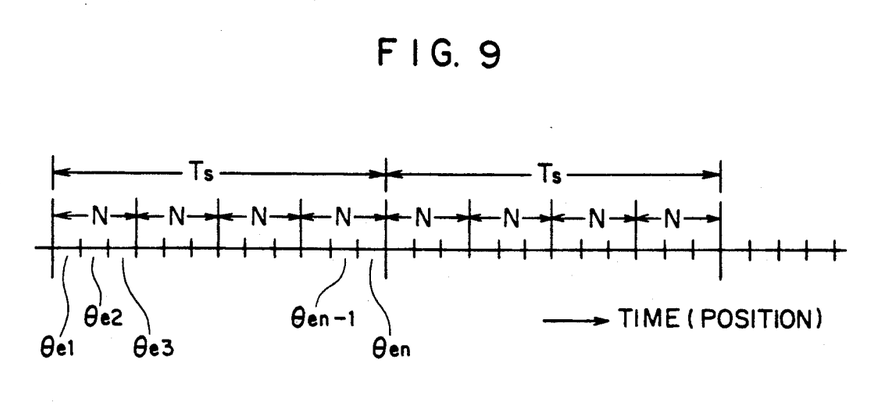
FIG. 9 is a diagram showing a technique for deriving the average value of a plurality of position errors.

These facts can be explained by referring to FIG. 9. In FIG. 9, Ts denotes a predetermined sampling time which corresponds to a predetermined angle related to commutation positions of the motor driving winding, for example. However, this sampling time Ts need not be especially related to the commutation positions, but may be defined as a predetermined number of pulses based upon the clock pulse or pulse generator. In general, the clock pulse or the pulse generator is referred to as timer as well. $\theta_{e1}, \theta_{e2} \cdots \theta_{en}$ are minimum units for measuring respective position errors. The pulse interval of the pulse generator becomes the shortest unit, but it may be defined as a fixed time obtained from a plurality of pulses. N comprises three minimum units $\theta_{e1}, \theta_{e2}$ and $\theta_{e3}$ collected into one group. A technique of deriving the mean value of position errors of this group N is shown. At this time, N is 3. However, N may be an arbitrary plural number and N is not limited to 3. By thus deriving the mean value of position errors of N minimum units, the high-frequency component can be removed. In FIG. 9, each sampling time Ts includes M=4 groups of N=3 minimum units $\Theta_3$. The flow chart of FIG. 8 will now be described by referring to FIG. 9. Step Ⓐ represents the state in which up counting is performed in a counter n. At step Ⓑ, it is checked whether the count in the counter n has reached, N or not. At step Ⓒ, the counter n is cleared when count in the counter n has reached N. At step Ⓓ, the progress of the position error value is calculated by the following expression.

$$W_{NE}(m) = W_{NE}(m-1) + \theta_{av1}(N)/N$$

Step Ⓔ represents the state in which the counter m counts up. At the next step ⑤, it is checked whether the count in the counter m has reached M or not. If the predetermined value has been reached, processing proceeds to computation of the position error value in step ⑥. Control is hereafter continued by steps similar to those in the flow of FIG. 6.

Figure 10:
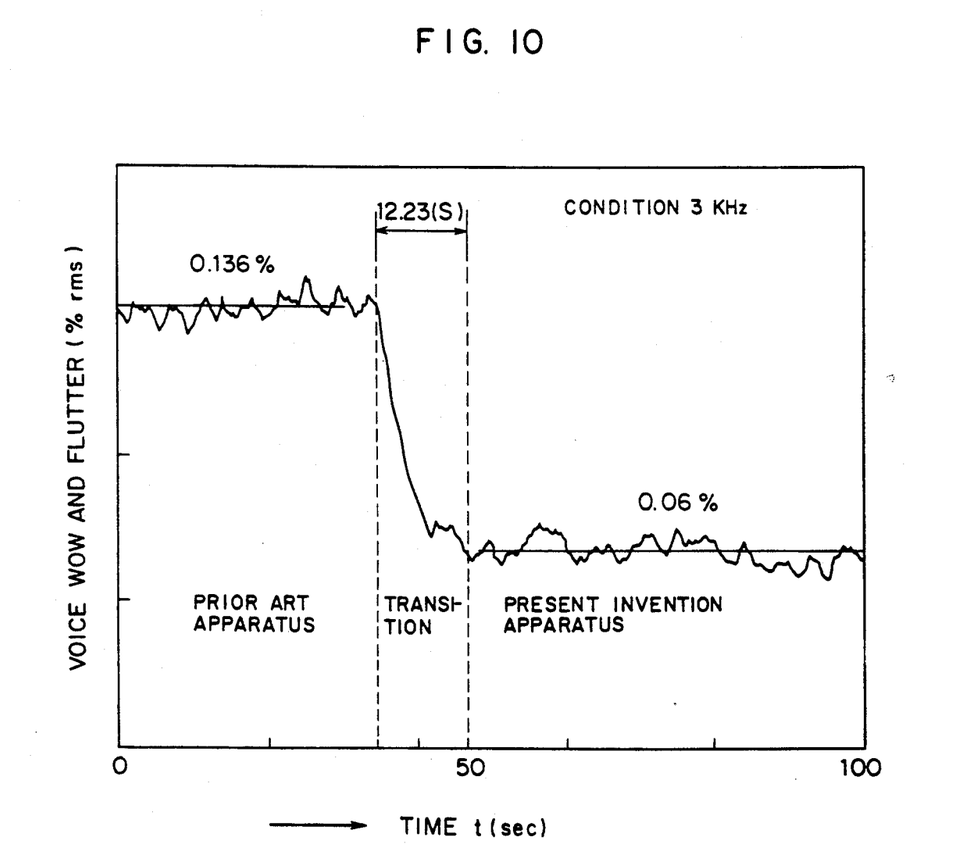
FIG. 10 is a diagram showing the effect of the present invention.

It is thus possible to execute operation at the lowest velocity error value indicated by B of FIG. 7 on the basis of the flow chart shown in FIG. 8. FIG. 10 shows the result of a test made to confirm the effect of the present invention in a VTR. That is to say, FIG. 10 shows an example of improvement of voice wow and flutter at 3 kHz, which is important in a VTR, obtained by application of the present invention.

As evident from FIG. 10, voice wow and flutter at 3 kHz is 0.136% in a prior art apparatus, whereas it is decreased to 0.06% in a present invention apparatus. In other words, execution of the present invention reduces voice wow and flutter to half or less as compared with the prior art apparatus. Further, it is known that voice wow and flutter of 2 to 4 kHz are especially rasping. However, a rasping voice caused by wow and flutter can be significantly removed by application of the present invention. Especially when the present invention is applied to acoustic devices, the effect is demonstrated.

In the above described embodiment, the method of averaging position errors has been adopted to remove the high-frequency component. However, the present invention is not limited to this. By removing the high-frequency component in a digital manner, for example, the expected object can be achieved.

Further, in FIG. 7, attention has been paid to the low-frequency component. If attention is paid to the high-frequency component, the high-frequency component has a value C at the point B. By defining the high-frequency position error value as the point C instead of the point C, therefore, control can be exercised in the same way.

Further, in the description of the embodiment, proportional control has been used. However, the present invention can also be adopted in a control apparatus comprising a proportional, integral or derivative control system. In this case, minimum rotation unevenness can be obtained by selectively changing the gain of proportional, integral or derivative control action to minimize the position error value.

The position control system has heretofore been described. In general, the present invention can be achieved by a control apparatus including a control apparatus for driving an apparatus to be controlled, a driver responsive to a command supplied from the above described control apparatus to supply a current or voltage to the apparatus to be controlled, and an element for detecting the actual operation state of the apparatus to be controlled as a current or voltage, the control apparatus multiplying an error signal by a gain and driving the apparatus to be controlled via the above described error signal being difference between a command value supplied to the control apparatus and the actual operation state, the control apparatus having functions of computing an error value on the basis of a plurality of the above described error signals computed, and changing a control gain according to the above described error value.

The present invention can also be embodied as a position control apparatus of a signal reproducer for moving on a track of a recording medium having a signal recorded thereon and for reproducing the signal recorded on the recording medium, the above described position control apparatus comprising detecting means for detecting the magnitude of a reproduced signal, means responsive to a detected value supplied from the above described detecting means to correct a position command of the above described position control apparatus, a driver responsive to the position command to drive an actuator of the signal reproducer, and means for calculating an integrated value of two or more past signals supplied from the above described detecting means, a control gain for correcting the above described position command according to the above described integrated value being made variable.

Figure 11:
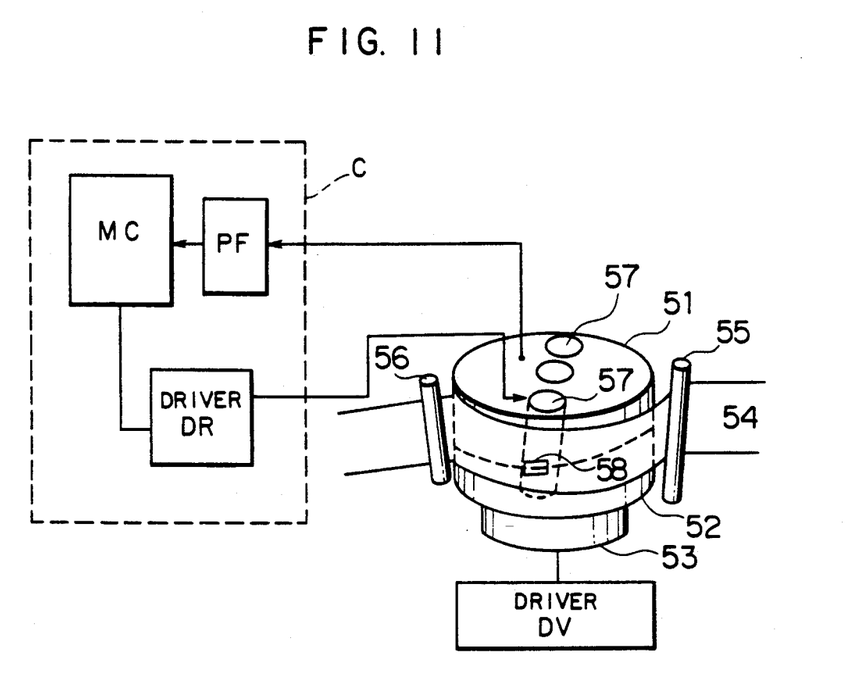
FIG. 11 is a diagram showing another embodiment of the present invention.

As a concrete example thereof, an embodiment of the case where the present invention is applied to position control of a VTR head is shown in FIG. 11.

In the present embodiment there will be now described a position control apparatus for controlling a head mounted on a rotary cylinder by means of a moving head actuator to reproduce a video signal recorded on magnetic tape of a VTR, the above described position control apparatus comprising means for detecting a detected value of a video signal, means for correcting a position command and supplying such a position command as to maximize the video signal to a driver, and means responsive to an integrated value of two or more video signals to change a correction gain of the position command maximizing the above described integrated value.

In recent VTR's, a moving head actuator for moving a head up and down in a rotary cylinder is mounted and such track control as to maximize a video signal reproduced by the head is exercised with the object of raising the picture quality. FIG. 11 shows the configuration of a cylinder section of a VTR. A magnetic tape 54 is pressed against a rotary cylinder 51 and a fixed cylinder 52 by guide pins 55 and 56. On the rotary cylinder 51, a head 58 for recording/reproducing video signals onto/from the magnetic tape 54 helically and a moving head actuator 57 for controlling the position of the head 58 are mounted. In the configuration, the rotary cylinder 51 is rotated at a constant velocity by a driver DV via a cylinder motor 53.

A position control apparatus C for the moving head actuator 57 comprises a microcomputer MC, a video signal detector PF and a driver DR. Control for detecting the position of the moving head actuator 57 and for maximizing the video signal detected by the head 58 becomes important. Therefore, a video signal detector PF detects the video signal output of the head 58 and transmits the resultant output to the microcomputer MC via an A-D converter. On the basis of this information, the microcomputer MC exercises such control as to maximize the video signal and transmits the control output to the moving head actuator 57 via the driver DR. As the moving head actuator 57, an actuator of voice coil type having such a structure that a moving element is fixed by spring is used. In this case, the current command supplied to the moving head actuator 57 is immediately converted into the position command by the spring. In case of fast response, it becomes position information.

Figure 12:
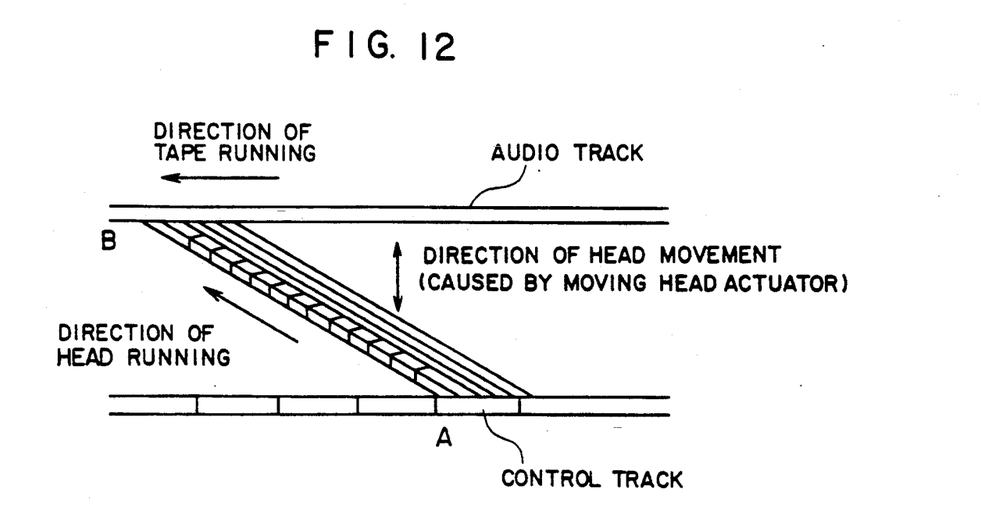
FIG. 12 is a diagram showing the recording state of a video signal on magnetic tape.
Figure 13:
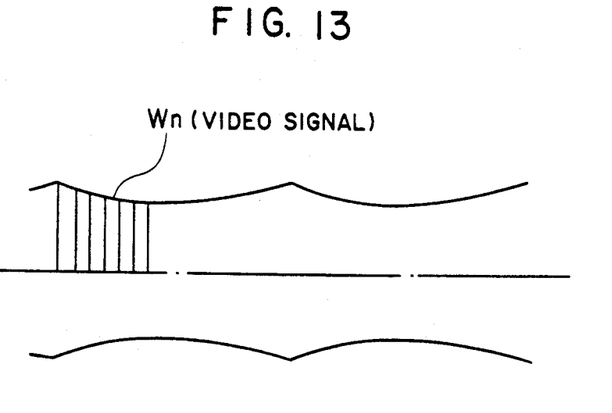
FIG. 13 is an output waveform diagram of a video signal.
Figure 14:
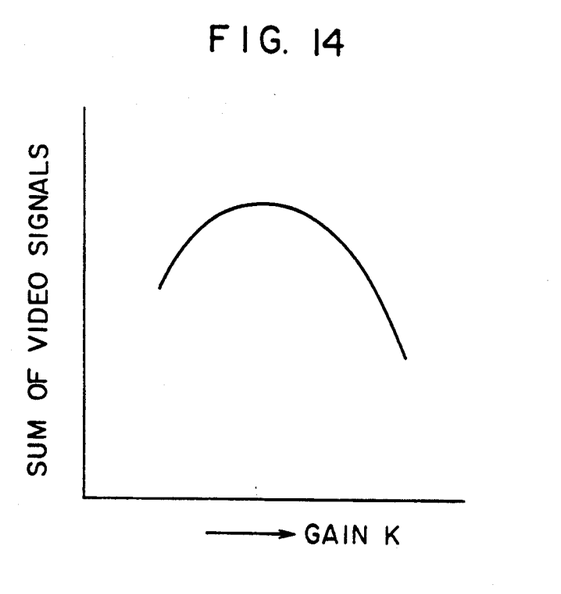
FIG. 14 is a diagram showing the sum of video signals as a function of the gain.
Figure 15:
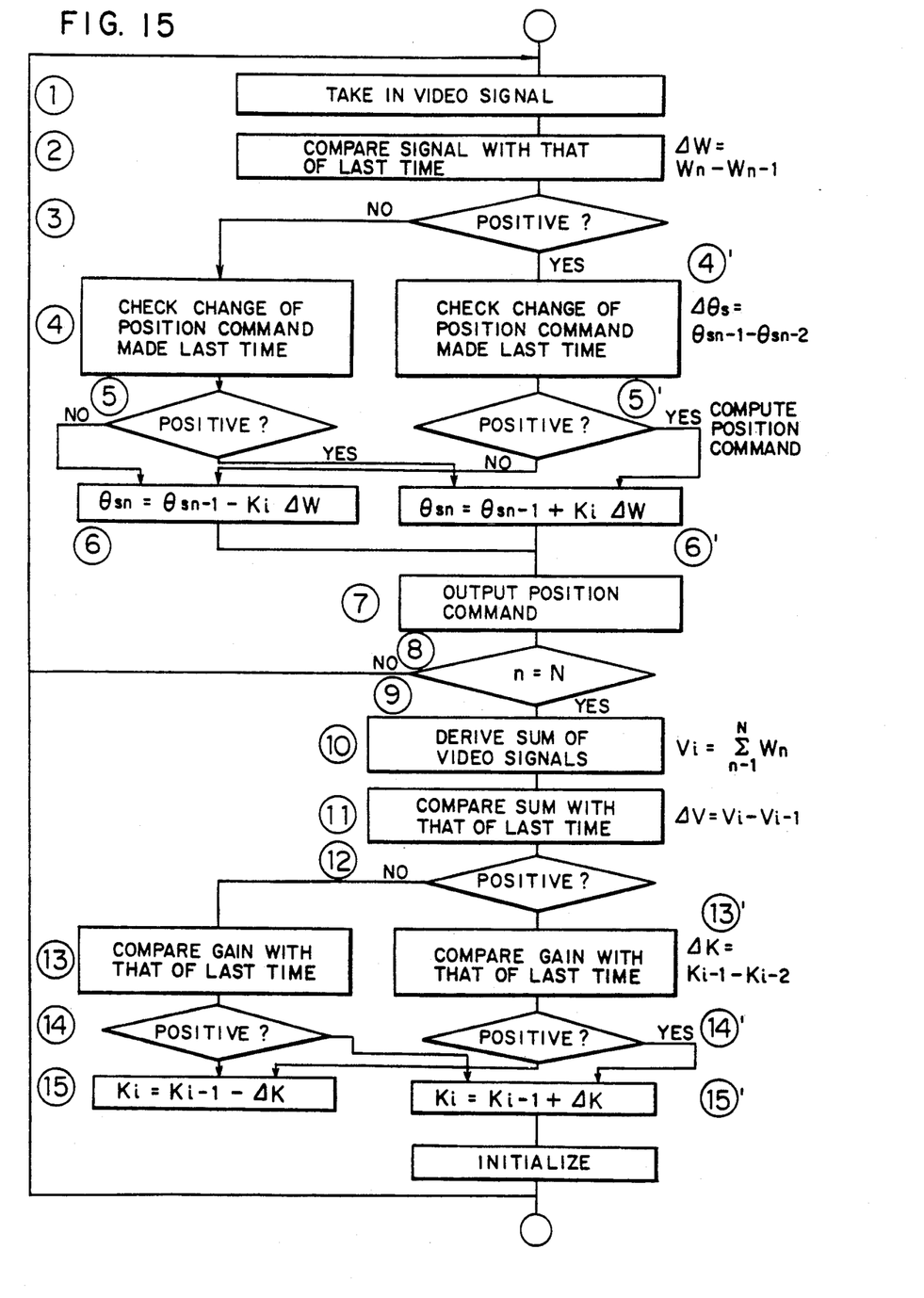
FIG. 15 s a flow chart of another embodiment.

FIG. 12 is a development diagram of FIG. 11 and shows the recording state of video signals on magnetic tape. The head 58 is moved in the illustrated direction by the cylinder motor in order to record and reproduce video signals. On the other hand, the moving head actuator 57 moves the head 58 in the width direction of the magnetic tape 54 to exercise such control as to maximize the video signal. Movement of the head 58 from A to B corresponds to half a revolution of the cylinder motor 53. The next track on the magnetic tape 54 is recorded and reproduced by a different head disposed at a distance of 180° on the rotary cylinder. FIG. 13 shows a reproduced video signal output. A signal obtained by detecting this signal is transmitted to the microcomputer MC. In a control method of the prior art, such control as to maximize the video signal Wn is exercised. The present invention provides such a control method as to maximize a sum Vi of detected video signals Wn. FIG. 14 shows an experimental result of the sum of video signals as a function of control gain. An optimum value of the control gain exists. FIG. 15 shows a flow chart of position control in a VTR according to the present invention. At step ①, a video signal Wn is taken in. At step ②, the video signal is compared with a video signal of the last time to form a judgment upon control of the last time. At steps ③ and ④, it is checked how the position command is changed from the last time. Further at steps ⑤ and ⑥, the position command is corrected by the product of a change ΔW in video signal and gain Ki in such a direction that the video signal is considered to become larger than that of the present state. At step ⑦, that position command is outputted. Up to this step, a control method of the prior art maximizing the video signal has been used. In accordance with the present invention, the following control method is added. That is to say, it is checked at step ⑧ whether the sampling period has elapsed or not, i.e., whether predetermined data of the video signal have been taken in or not. This sampling period may be half a revolution of the cylinder motor or it may be one revolution of the cylinder motor. The sampling period can thus arbitrarily be set. Further, at step ⑨, the sum of video signals during a sampling interval is derived. At steps 10, 11, the sum of video signal is compared with the sum of video signals of the last time. At steps 12 to 15, the gain is corrected in such a direction as to increase the sum of video signals. By the control heretofore described, position control maximizing the video signal becomes possible. At step ⑥ of FIG. 15, the position command is corrected by the product of the gain and a change in video signal. However, the position command may be corrected by only the gain with the change of the video signal being defined as unity. Further, although the present scheme is shown with proportional control, the effect of the present invention can be fully demonstrated even with integral control or proportional integral control.

Further, the present invention is not limited to position control apparatuses using magnetic tape as the signal medium. For example, the present invention can also be applied to position control apparatuses in which the recording signal is written onto a rotary disk and contents thereof are detected by a head which can be controlled in position.

Firstly in accordance with the present invention, there is constructed a moving body position control apparatus for supplying an adequate current or voltage command to the moving body on the basis of relation between a position detection signal and a position command signal supplied from outside, the position control apparatus comprising a driver for supplying a current or voltage having a magnitude depending upon the position command signal and the position detection signal, a microcomputer for comparing the position command signal with the position detection signal obtained from the position detecting circuit to drive the driver, computing a means for computing difference between the position command signal and the position detecting signal as a position error and multiplying the position error by a gain to derive a driving signal of the driver, the computing means being included in the microcomputer, at least two past position error values being derived by the computing means, and gain adjusting means responsive to a positive change in position error value accompanied by a positive gain change, to decrease the gain, responsive to a positive change in position error value accompanied by a negative gain change to increase the gain, responsive to a negative change in position error value accompanied by a positive gain change, to increase the gain, and responsive to a negative change in position error value accompanied by a negative gain change to decrease the gain, the gain adjusting means being included in the microcomputer. Therefore, it is possible to provide a moving body position control apparatus or method capable of adjusting the control gain in the optimum direction and significantly reducing the rotation unevenness even when the state of the moving body is changed by load or temperature in the course of velocity or position control.

Secondly, there is constructed a signal reproducing apparatus for reproducing a signal recorded in the recording medium, the signal reproducing apparatus comprising detecting means for detecting the magnitude of a reproduced signal, means responsive to a detected value supplied from the detecting means to correct a position command of the signal reproducing apparatus, a driver responsive to the position command to drive an actuator of a signal reproducer, and means for calculating an integrated value of two or more past signals supplied from the detecting means, a control gain for correcting the position command according to the integrated value being made variable. Therefore, it is possible to provide a signal reproducing apparatus having less rotation unevenness.

Thirdly, there is constructed a magnetic signal reproducing apparatus for controlling a head mounted on a rotary cylinder by means of a moving head actuator to reproduce a video signal recorded on magnetic tape, the magnetic signal reproducing apparatus comprising means for detecting a detected value of a video signal, means for correcting a position command and supplying such a position command as to maximize the video signal to a driver, and means responsive to an integrated value of two or more video signals to change a correction gain of the position command maximizing the integrated value. Therefore, it is possible to provide a magnetic signal reproducing apparatus causing less wow and flutter.

Fourthly, there is constructed a position control apparatus for supplying an adequate current or voltage command to an inverter for driving a brushless motor on the basis of a relation between a position detection signal obtained from a position detecting circuit and a position command signal supplied from outside, the position control apparatus comprising a microcomputer for comparing the position command signal with the position detection signal obtained from the position detecting circuit to drive the inverter, computing a means for computing difference between the position command signal and the position detection signal as a position error and multiplying the position error by a gain to derive a driving signal of the inverter, the computing means being included in the microcomputer, at least two past position error values being derived by the computing means, and gain adjusting means responsive to a positive change in position error value accompanied by a positive change to decrease the gain, responsive to a positive change in position error value accompanied by a negative gain change to increase the gain, responsive to a negative change in position error value accompanied by a positive gain change to increase the gain, and responsive to a negative change in position error value accompanied by a negative gain change to decrease the gain, the gain adjusting means being included in the microcomputer. Therefore, it is possible to provide a brushless motor reduced in rotation unevenness and hunting.

We claim:

1. A moving body position control apparatus comprising:
   driving means for driving a moving body in response to a drive signal;
   position detecting means for detecting a position of the moving body and recurrently outputting a position detection signal representing the detected position of the moving body;
   receiving means for receiving a position command signal representing a desired position of the moving body;
   position error determining means for determining a difference between the position command signal and the position detection signal recurrently output from the position detecting means, and recurrently outputting a position error representing the determined difference between the position command signal and the position detection signal;
   position adjusting means having an adjustable gain for generating the drive signal for the driving means on the basis of the adjustable gain and the position error recurrently output from the position error determining means so as to reduce the position error substantially to zero;
   position error value calculating means for recurrently calculating a position error value on the basis of a first plurality of position errors output from the position error determining means during a first predetermined period; and
   gain adjusting means for adjusting the adjustable gain of the position adjusting means on the basis of the position error value.

2. An apparatus according to claim 1, wherein the position error value calculating means includes:
   means for obtaining the absolute values of the plurality of position errors; and
   means for calculating the position error value on the basis of the absolute values.

3. An apparatus according to claim 1, wherein the position error value calculating means includes:
   means for calculating a mean value of a second plurality of position errors output from the position error determining means during a second predetermined period preceding the first predetermined period;
   means for subtracting the mean value from each position error of the first plurality of position errors to obtain a plurality of subtracted position errors;
   means for obtaining the absolute values of the plurality of subtracted position errors; and
   means for calculating the position error value on the basis of the plurality of absolute values.

4. An apparatus according to claim 1, wherein the gain adjusting means includes:
   means for determining whether the position error value has increased or decreased;
   means for determining whether the adjustable gain has increased or decreased; and means for decreasing the adjustable gain if the position error value has increased and the adjustable gain has increased, increasing the adjustable gain if the position error value has increased and the adjustable gain has decreased, increasing the adjustable gain if the position error value has decreased and the adjustable gain has increased, and decreasing the adjustable gain if the position error value has decreased and the adjustable gain has decreased.

5. An apparatus according to claim 1, wherein the first plurality of position errors includes a plurality of groups of position errors, and wherein the position error value calculating means includes:
means for calculating respective mean values of the plurality of groups of position errors;
means for obtaining the absolute values of the mean values; and
means for calculating the position error value on the basis of the absolute values.

6. A signal reproducing apparatus for reproducing a video signal recorded on a magnetic tape comprising:

a magnetic head for reproducing the video signal recorded on the magnetic tape;
a moving head actuator for moving the magnetic head relative to the magnetic tape in response to a drive signal;
detecting means for detecting the video signal reproduced by the magnetic head and recurrently outputting a detection signal representing the detected video signal;
driving means having an adjustable gain for generating the drive signal for the moving head actuator on the basis of the detection signal so as to maximize the video signal reproduced by the magnetic head;
adding means for adding together a plurality of detection signals output from the detecting means during a predetermined period of time and recurrently outputting a sum signal representing the added detection signals; and
gain adjusting means for adjusting the adjustable gain of the driving means on the basis of the sum signal.

* * * * *